(12) United States Patent
Zucker et al.

(10) Patent No.: US 10,972,457 B2
(45) Date of Patent: Apr. 6, 2021

(54) LINKING A PHYSICAL ITEM TO A VIRTUAL ITEM

(71) Applicant: NCR Corporation, Atlanta, GA (US)

(72) Inventors: Brent Vance Zucker, Roswell, GA (US); Robert Alexander Borowicz, Atlanta, GA (US); Adam Justin Lieberman, Suwanee, GA (US); Pavel Šavara, Prague (CZ)

(73) Assignee: NCR Corporation, Atlanta, GA (US)

( * ) Notice: Subject to any disclaimer, the term of this patent is extended or adjusted under 35 U.S.C. 154(b) by 198 days.

(21) Appl. No.: 16/174,912

(22) Filed: Oct. 30, 2018

(65) Prior Publication Data

US 2020/0137047 A1 Apr. 30, 2020

(51) Int. Cl.
*H04L 29/06* (2006.01)
*H04W 4/35* (2018.01)
*G06K 9/00* (2006.01)
*G06F 16/51* (2019.01)

(52) U.S. Cl.
CPC .......... *H04L 63/0853* (2013.01); *G06F 16/51* (2019.01); *G06K 9/00288* (2013.01); *H04L 63/0861* (2013.01); *H04W 4/35* (2018.02)

(58) Field of Classification Search
CPC .... G06F 21/34; G06F 17/3028; G06F 21/602; G06F 21/6245; G06F 16/51; H04L 63/0853; H04L 63/0861; H04L 9/3213; H04L 9/3247; H04L 9/3268; H04L 9/3297; G06Q 20/3678; G06Q 20/3829; G06Q 20/389; G06Q 20/4012; G06Q 20/40145; G06Q 2220/00; G06K 9/00288; G06K 9/00295; G06K 9/00369; H04W 4/35; H04W 4/80; H04W 12/00409
See application file for complete search history.

(56) References Cited

U.S. PATENT DOCUMENTS

2017/0148014 A1 * 5/2017 Bouse ............... G06Q 20/4014

* cited by examiner

*Primary Examiner* — Abiy Getachew
(74) *Attorney, Agent, or Firm* — Schwegman, Lundberg & Woessner

(57) ABSTRACT

Disclosed are systems and methods for mapping a virtual shopper to a physical shopper. The systems and methods may include receiving, at a backend system, unidentified customer data including information about an unidentified customer. Customer identity data including identifying information about the customer may be received from the customer. An authentication token may be generated that links the unidentified customer data to the customer identity data.

19 Claims, 3 Drawing Sheets

LINKING A PHYSICAL ITEM TO A VIRTUAL ITEM

BACKGROUND

Computer vision and image processing techniques have advanced in recent years. However, one difficult and unsolved processing task includes knowing when to associate one tracked item with another tracked item. This has been particularly difficult in frictionless store systems where decisions have to be made from the images as to whether an item captured in a first part of a store is the same item captured in a second part of the store.

SUMMARY

Disclosed are systems and methods for mapping a virtual shopper to a physical shopper. The systems and methods may include receiving, at a backend system, unidentified customer data including information about an unidentified customer. Customer identity data including identifying information about the customer may be received from the customer. An authentication token may be generated that links the unidentified customer data to the customer identity data.

BRIEF DESCRIPTION OF THE FIGURES

The above-mentioned and other features and advantages of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplifications set out herein illustrate exemplary embodiments of the invention, and such exemplifications are not to be construed as limiting the scope of the invention any manner.

DETAILED DESCRIPTION

Figure 1:
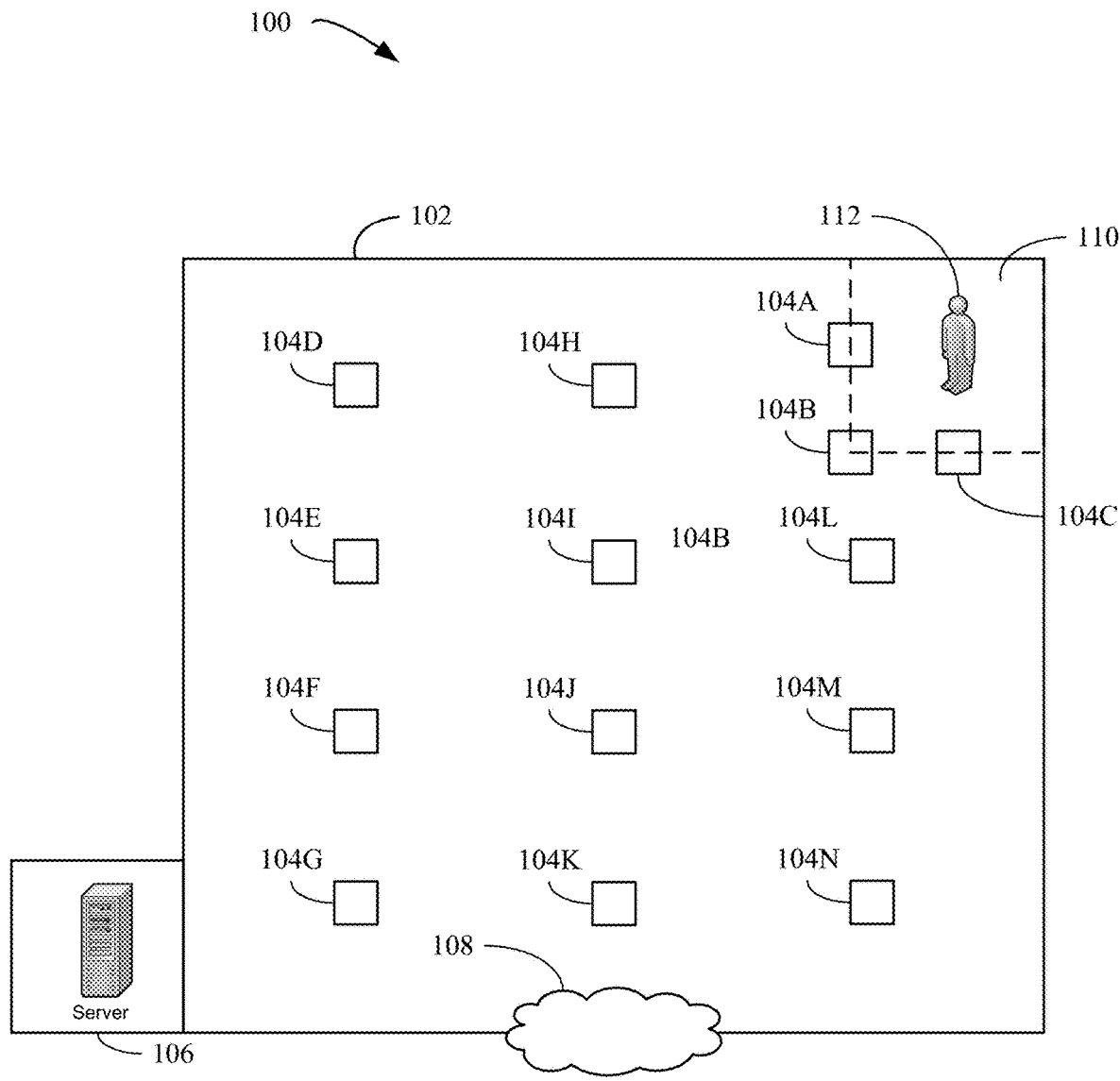
FIG. 1 shows an example operating environment consistent with this disclosure.

The following detailed description refers to the accompanying drawings. Wherever possible, the same reference numbers are used in the drawings and the following description to refer to the same or similar elements. While embodiments and examples are described, modifications, adaptations, and other implementations are possible. For example, substitutions, additions, or modifications may be made to the elements and stages illustrated in the drawings, and the systems and methods described herein may be modified by substituting, reordering, or adding stages to the disclosed methods or elements to the disclosed systems. Accordingly, the following detailed description does not limit this disclosure. Instead, the proper scope of any invention disclosed herein is defined by the appended claims.

When a shopper enters a frictionless checkout store they may be asked to check-in in a fixed physical location. The systems and methods disclosed herein allow for a variety of methods for an authentication token that maps the physical shopper to a virtual identity.

When a customer is in the frictionless checkout store and they pick up goods, a virtual identity may be used to track and charge them. The systems and methods disclosed herein may allow for the mapping a physical shopper in the frictionless checkout store's check-in to a virtual identifier. The virtual identifier may then be used to track the physical shopper throughout the store and account for products the customer wishes to purchase.

To map the physical shopper to the virtual identity a designated check-in zone may be monitored by sensors such as cameras, scales, BLUETOOTH® or other beacons, etc. The shopper may check-in or be checked-in automatically to link the shopper to their virtual identity. Example ways to check in may include the use of quick response (QR) codes, biometrics, use of mobile devices, etc. For example, a customer may scan a QR code to provide a virtual identity. Also, the customer may register their facial image and a biometric face scan may be used to provide their virtual identity. Furthermore, the customer may download an app which can allow for communications with a backend system to provide their virtual identity.

The virtual identity may be associated with a register account such that credit card information, shopping preferences, etc. may be provided. The credit card information shopping preferences, etc. may be saved in a user profile. The various information may be collected and/or updated as the customer shops. Once the customer leaves the frictionless checkout store with goods, he or she may be charged using the credit card information saved in the user profile.

Without the systems and methods disclosed herein, the would be no way to identify a customer and correctly link them to a virtual shopper via an authentication token. Without the ability to link a customer to a virtual shopper, there would be no way to charge the correct account when the customer exits the frictionless checkout store.

FIG. 1 shows an example operating environment 100 consistent with this disclosure. As shown in FIG. 1, operating environment 100 may include a store 102. Within store 102 may be a plurality of sensors 104 (individually sensors 104A through 104N) and a server 106. Sensors 104 may be in communications with server 106 via a network 108. Also, store 102 may also include a check-in area 110. While FIG. 1 shows three sensors located at check-in area 110, any number of sensors may be used to capture unidentified customer data about a customer 112.

During use, customer 112 may enter store 102 and pass into check-in area 110. Upon entering store 102, sensors 104 may collect data about customer 112. The data, sometimes referred to as unidentified customer data because the data is associated with an unidentified customer, may be transmitted from sensors 104 to server 106 via network 108.

Collecting the unidentified customer data may include collecting a variety of information about customer 112. For example, one or more of sensors 104 may be a camera and may capture images of customer 112. One or more of sensors 104 may be a scale that captures a weight of customer 112. One or more of sensors 104 may be a beacon, such as a BLUETOOTH® beacon that captures information from a mobile device of customer 112. In addition, the unidentified customer data may be collected by more than one sensor or method. For instance, the weight of customer 112 may be captured in addition to images of customer 112.

Depending on how the unidentified customer data is collected additional processing may be needed. For instance, if images of customer 112 are captured, image analysis may be used to extract information about customer 112. For example, the images may be cropped to remove extraneous imagery. For instance, server 106 may utilize images of known background elements to filter the background elements from any images captured by sensors 104.

Upon being received at server 106, the images may be processed by an encoder that may extract attributes about customer 112. Extracting attributes about customer 112 may include determining color, text written on a shirt, a hat, or other clothing worn by customer 112, a height of customer 112, approximate weight of customer 112, color of clothing worn by customer 112, etc.

The number of attributes may be preset or may depend upon the images collected. For example, the number of attributes may be a set number such as N. In another example, the number of attributes may be determined by the number of unique features that can be identified from the images. For instance, using a background reference, a height of customer 112 as well as a color of his or her shirt, pants, shoes (including logos upon the shirt, pants, and shoes) may be uniquely identified from the images.

The attributes extracted from the images along with any other data collected in check-in area 110 may be assigned an initial identification value and saved within an k-nearest neighbor (k-NN) database. As disclosed herein, the k-NN database may be saved on a memory of server 106 or may be stored offsite.

While in check-in area 110 customer 112 may provide his or her customer identity data. The customer identity data may be provided by the customer in a multitude of ways. For instance, upon entering check-in area 110 one of sensors 104, which may be a camera, may capture an image of customer 112. The image may be used by server 106 to perform a facial recognition process to identify customer 112. In another instance, customer 112 may approach a kiosk and provide identifying information such as a username and password or provide a QR code that can be scanned at the kiosk or with one of sensors 104. In yet another instance, upon entering check-in area 110 a mobile device of customer 112, running an app provided by store 102, may push a username and password or other identifying credentials to server 106 via network 108. In addition, the customer identity data may be provided in more than one manner. For instance, facial recognition may be used in conjunction credentials being pushed from a mobile device of customer 112.

With the unidentified customer data and the customer identity data, server 106 may generate an authentication token that links customer identity data to the unidentified customer data. The authentication token can then be associated with a virtual shopper. The virtual shopper can then be used to track customer 112 as customer 112 walks through store 112.

For example, as customer 112 walks through store 102, additional images of customer 112, or an item customer 112 handles or looks at, may be captured by sensors 104. These new images may be received by server 106 and features from the new images extracted as described herein. The extracted attributes may be stored in a feature vector and assigned a temporary identification value.

The feature vector and the temporary identification value may be submitted to server 106 as a query. Server 106 may then determine which of the feature vectors stored in a k-NN database the feature vector associated with the temporary identification value is closest to and thus determine that the customer in the second set of images is customer 112. Stated another way, server 106 may determine the identity of customer 112 as he or she moves throughout store 102 by consistently mapping attributes from a plurality of images collected by sensors 104 as customer 112 walks through store 102 using the attributes and an initial set of attributes stored in the k-NN database along with the authentication token and the customer identity data.

Using server 106 in conjunction with sensors 104 customer 112 can be tracked throughout store 102. The departments visited and the items customer 112 looks at and places in a shopping cart may be tracked and stored in a user profile. The user profile may be used to target ads, coupons, etc. to customer 112 while in store 102.

When customer 112 exits store 102 customer data, authentication token, etc. may be flushed from the k-NN database. The flushing of customer 112's information may allow for faster processing of other feature vectors as they cannot be a match to customer 112's attributes if he or she has left store 102.

In addition, when customer 112 exits store 102, any items customer 112 may have in a shopping cart or that may have been scanned with customer 112's mobile device may be charged to an account or credit card belonging to customer 112 and stored with a user profile of customer 112.

Figure 2:
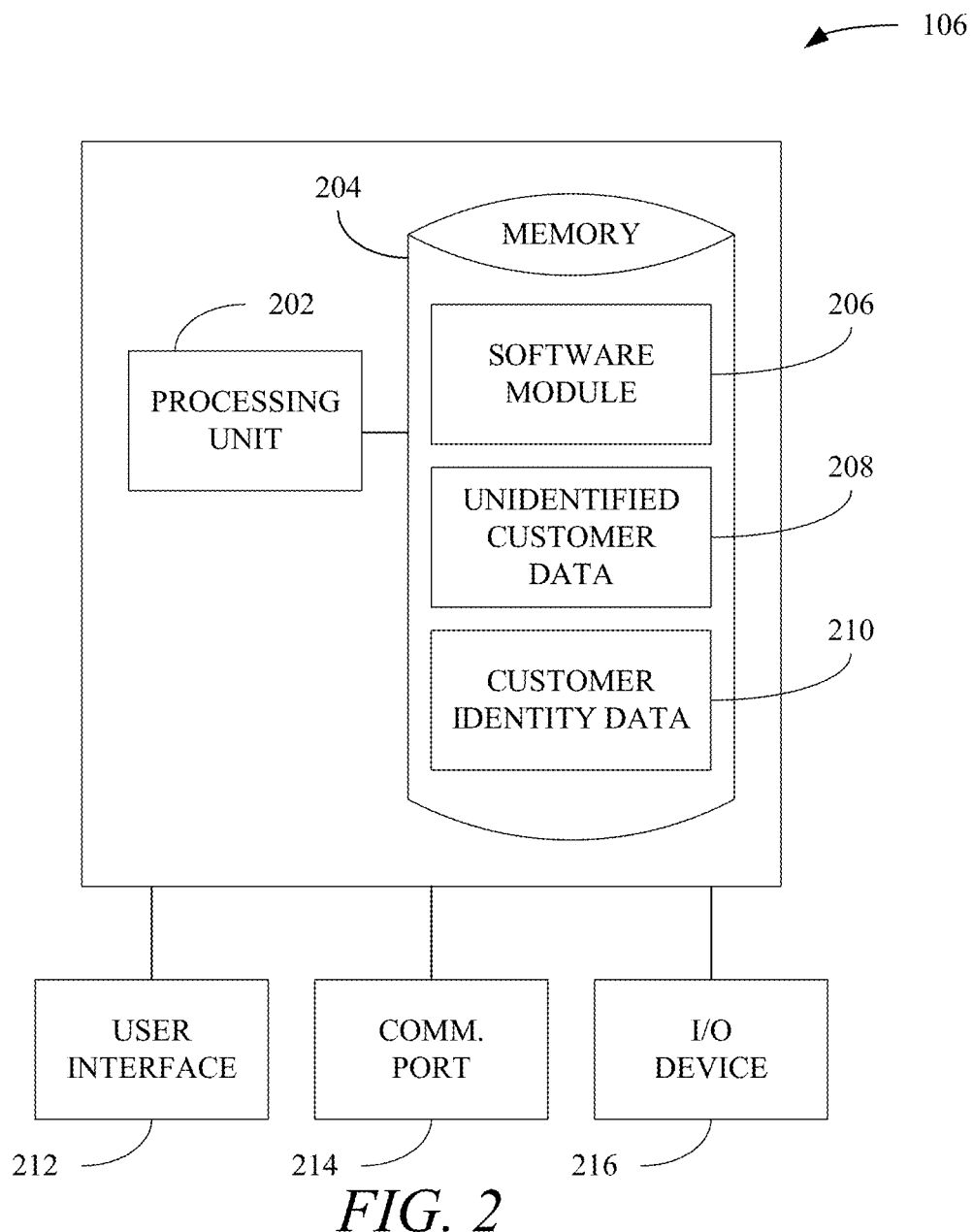
FIG. 2 shows an example schematic of a server consistent with this disclosure.

FIG. 2 shows an example schematic of server 106. As shown in FIG. 2, server 106 may include a processing unit 202 and a memory 204. The memory 204 may include a software module 206, unidentified customer data 208, and customer identity data 210. While executing on processing unit 202, the software module 206 may perform processes for linking a physical shopper to a virtual shopper as disclosed herein, including, for example, one or more stages included in a method 300 described below with respect to FIG. 3. Server 106 may also include a user interface 212, a communications port 214, and an input/output (I/O) device 216.

As disclosed herein, unidentified customer data 208 may include data that is collected from sensors, such as sensors 104, when a shopper, such as customer 112, enters a check-in area, such as check-in area 110. The unidentified customer data 208 may include multiple sets of data for the various customers that visit the store.

Unidentified customer data 208 also may include data captured by sensors 104 as the customer travels through the store. For example, unidentified customer data 208 may include images, data that identifies the camera that captured each of the images, a time stamp for each image, and an identification value. This unidentified customer data 208 may be analyzed as disclosed herein when the customer enters the store. Once the attributes from the data are extracted it may be linked with the customer and the authentication token assigned to the customer upon entering the store.

The unidentified customer data 208 may include an expiration time. As a result, if the unidentified customer data 208 is not matched with customer identity data within a given time, the unidentified customer data 208 may be flushed from memory 204. The removal of expired unidentified customer data 208 may allow for faster matching of unidentified customer data to customer identity data because there are less potential matches. Thus, the risk of mismatching the data is also reduced.

Customer identity data 210 may include the authentication token assigned to a customer upon entering the store. The customer identity data may include data supplied by the customer at a kiosk, via a mobile device, etc. as disclosed herein. Customer identity data 210 may be retrieved from a database or supplied by the customer. For example, the customer may supply a pointer from his or her mobile device to the server and the server may retrieve customer identity data 210 from a database using the pointer.

Both unidentified customer data 208 and customer identity data 210 may be stored as a plurality of feature vectors. The feature vectors may be created by an encoder that may be part of software module 206. The feature vectors may include the various attributes that are extracted from data gathered via sensors 104 as disclosed herein. The feature vectors may have the same dimensions or may have different dimensions. For example, feature vectors generated by the encoder for each customer that enters the store via the check-in area may have differing dimensions depending on the number of attributes the encoder is able to extract from the images captured via cameras 104. Also, as the customer walks through the store additional attributes may be captured and added to the feature vector for the customer.

User interface 212 can include any number of devices that allow a user to interface with server 106. Non-limiting examples of user interface 212 include a keypad, a microphone, a display (touchscreen or otherwise), etc.

Communications port 214 may allow server 106 to communicate with various information sources and devices, such as, but not limited to, remote computing devices, mobile devices, peripheral devices, etc. Non-limiting examples of communications port 214 include, Ethernet cards (wireless or wired), BLUETOOTH® transmitters and receivers, near-field communications modules, etc. User interface 212 may also use communications port 214 to communicate with server 106. For example, user interface 212 may be a table computer that includes a virtual keyboard that communicates with server 106 via communications port 214.

I/O device 216 may allow server 106 to receive and output information. Non-limiting examples of I/O device 216 include, but are not limited to, a camera (still or video), sensors (such as sensors 104), a weight detection device such as a scale, a printer for printing receipts and packing lists, a scanner, etc.

Figure 3:
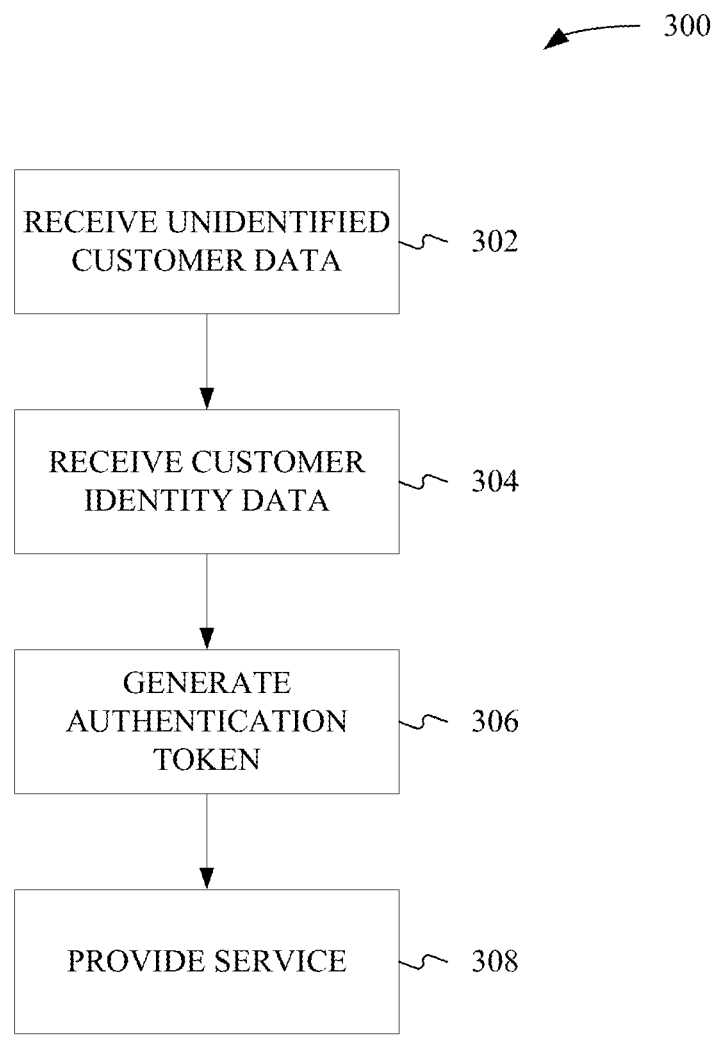
FIG. 3 shows an example method consistent with this disclosure.

FIG. 3 shows an example method 300 consistent with this disclosure. Method 300 may begin at stage 302 where unidentified customer data may be received. For example, sensors, such as sensors 104, may capture images of a customer and transmit the images to a server, such as server 106. For instance, as disclosed herein, when customer 112 enters store 102 via check-in area 110, sensors 104 may capture various images, weight, etc. of customer 112 and transmit the images to server 106.

From stage 302 method 300 may proceed to stage 304 where customer identity data may be received. For instance, as disclosed herein, a user may use a kiosk to enter a username and password, a member number, etc. In another instance, a mobile device of the customer may transmit a username and password, a member number, etc. to the server.

From stage 304 method 300 may proceed to stage 306 where an authentication token may be generated. The authentication token may be generated upon the customer identity data being matched to the unidentified customer data. For example, the authentication token may be generated by mapping identities to basic authentication strings so that when the customer identifies himself or herself, the customer's basic authentication string may be returned.

From stage 306 method may proceed to stage 308 where a service may be provided. As disclosed herein, the service provided may include tracking a customer through a store and tracking items to be purchased upon the customer leaving the store. The service may be automatically checking out after he or she leaves the store. The service could be guiding the customer to a particular location. For example, the customer may be at the store to pick up an item that was previously ordered and paid for and the service may be pushing instructions to the customer's mobile device to guide the customer to a pickup area. At the movies, the service may be authorizing the customer to enter a turnstile and provide directions to an appropriate theater where the movie is showing.

EXAMPLES

Example 1 is a method comprising: receiving, at a backend system, unidentified customer data including information about an unidentified customer; receiving, from the customer, customer identity data, the customer identity data including identifying information about the customer; and generating an authentication token that links the unidentified customer data to the customer identity data.

In Example 2, the subject matter of Example 1 optionally includes wherein receiving unidentified customer data includes receiving a plurality of images of the customer from multiple cameras.

In Example 3, the subject matter of Example 2 optionally includes wherein the multiple cameras are arranged at different angles relative to the customer.

In Example 4, the subject matter of any one or more of Examples 2-3 optionally include extracting the unidentified customer data from at least one of the plurality of images.

In Example 5, the subject matter of any one or more of Examples 1-4 optionally include wherein receiving unidentified customer data includes receiving a weight of the unidentified customer.

In Example 6, the subject matter of any one or more of Examples 1-5 optionally include wherein receiving the customer identity data includes receiving the customer identity data from a mobile device of the customer.

In Example 7, the subject matter of Example 6 optionally includes wherein the customer identity data is pushed from the mobile device to the backend system.

In Example 8, the subject matter of any one or more of Examples 1-7 optionally include wherein receiving the customer identity data includes transmitting, by the backend system, a request to a mobile device of the customer.

In Example 9, the subject matter of any one or more of Examples 1-8 optionally include wherein receiving the customer identity data includes receiving the customer identity data from a kiosk.

In Example 10, the subject matter of any one or more of Examples 1-9 optionally include wherein unidentified customer data includes biometric data of the customer and the customer identity data includes complimentary biometric data.

Example 11 is a system comprising: a plurality of sensors located proximate an entrance to a store; a backend system including a processor; and a non-transitory computer-readable storage medium storing instruction that, when executed by the processor, cause the processor to perform operations comprising: receiving unidentified customer data including information about an unidentified customer, receiving, from the customer, customer identity data, the customer identity data including identifying information about the customer; and generating an authentication token that links the unidentified customer data to the customer identity data.

In Example 12, the subject matter of Example 11 optionally includes wherein the plurality of sensors includes a plurality of cameras operable to transmit a plurality of images of the customer to the backend system; and receiving unidentified customer data includes receiving the plurality of images of the customer from multiple cameras.

In Example 13, the subject matter of Example 12 optionally includes wherein the multiple cameras are arranged at different angles relative to the customer.

In Example 14, the subject matter of any one or more of Examples 12-13 optionally include extracting the unidentified customer data from at least one of the plurality of images.

In Example 15, the subject matter of any one or more of Examples 11-14 optionally include wherein the plurality of sensors includes a scale located in the floor of the entrance to the store; and receiving unidentified customer data includes receiving a weight of the unidentified customer from the scale.

In Example 16, the subject matter of any one or more of Examples 11-15 optionally include wherein receiving the customer identity data includes receiving the customer identity data from a mobile device of the customer.

In Example 17, the subject matter of Example 16 optionally includes wherein the customer identity data is pushed from the mobile device to the backend system.

In Example 18, the subject matter of any one or more of Examples 11-17 optionally include wherein receiving the customer identity data includes transmitting, by the backend system, a request to a mobile device of the customer.

In Example 19, the subject matter of any one or more of Examples 11-18 optionally include wherein receiving the customer identity data includes receiving the customer identity data from a kiosk.

In Example 20, the subject matter of any one or more of Examples 11-19 optionally include wherein unidentified customer data includes biometric data of the customer and the customer identity data includes complimentary biometric data.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

The invention claimed is:

1. A method comprising:
   receiving, at a backend system, unidentified customer data including information about an unidentified customer;
   receiving, from the customer, customer identity data, the customer identity data including identifying information about the customer; and
   generating an authentication token that links the unidentified customer data to the customer identity data,
   wherein receiving unidentified customer data includes receiving a plurality of images of the customer from multiple cameras.

2. The method of claim 1, wherein the multiple cameras are arranged at different angles relative to the customer.

3. The method of claim 1, further comprising extracting the unidentified customer data from at least one of the plurality of images.

4. The method of claim 1, wherein receiving unidentified customer data further includes receiving a weight of the unidentified customer.

5. The method of claim 1, wherein receiving unidentified customer data further includes receiving the customer identity data from a mobile device of the customer.

6. The method of claim 5, wherein the customer identity data is pushed from the mobile device to the backend system.

7. The method of claim 1, wherein receiving unidentified customer data further includes transmitting, by the backend system, a request to a mobile device of the customer.

8. The method of claim 1, wherein receiving unidentified customer data further includes receiving the customer identity data from a kiosk.

9. The method of claim 1, wherein unidentified customer data includes biometric data of the customer and the customer identity data includes complimentary biometric data.

10. A system comprising:
    a backend system including a process;
    a plurality of sensors located proximate an entrance to a store, the plurality of sensors including a plurality of cameras operable to transmit a plurality of images of the customer to the backend system; and
    a non-transitory computer-readable storage medium storing instruction that, when executed by the processor, cause the processor to perform operations comprising:
       receiving unidentified customer data including information about an unidentified customer,
       receiving, from the customer, customer identity data, the customer identity data including identifying information about the customer; and
       generating an authentication token that links the unidentified customer data to the customer identity data,
    wherein receiving unidentified customer data includes receiving the plurality of images of the customer from multiple cameras.

11. The system of claim 10, wherein the multiple cameras are arranged at different angles relative to the customer.

12. The system of claim 10, further comprising extracting the unidentified customer data from at least one of the plurality of images.

13. The system of claim 10, wherein
    the plurality of sensors further includes a scale located in the floor of the entrance to the store; and
    receiving unidentified customer data further includes receiving a weight of the unidentified customer from the scale.

14. The system of claim 10, wherein receiving the customer identity data further includes receiving the customer identity data from a mobile device of the customer.

15. The system of claim 14, wherein the customer identity data is pushed from the mobile device to the backend system.

16. The system of claim 10, wherein receiving the customer identity data further includes transmitting, by the backend system, a request to a mobile device of the customer.

17. The system of claim 10, wherein receiving the customer identity data further includes receiving the customer identity data from a kiosk.

18. The system of claim 10, wherein unidentified customer data includes biometric data of the customer and the customer identity data includes complimentary biometric data.

19. A method comprising:
    receiving, at a backend system, unidentified customer data including information about an unidentified customer from multiple cameras located in a store and arranged at different angles relative to the customer;

receiving, from the customer at a kiosk, customer identity data, the customer identity data including identifying information about the customer; and generating an authentication token that links the unidentified customer data to the customer identity data.

* * * * *